(No Model.)
R. H. FROUDE.
APPARATUS FOR LUBRICATING PISTONS, &c.
No. 295,381. Patented Mar. 18, 1884.
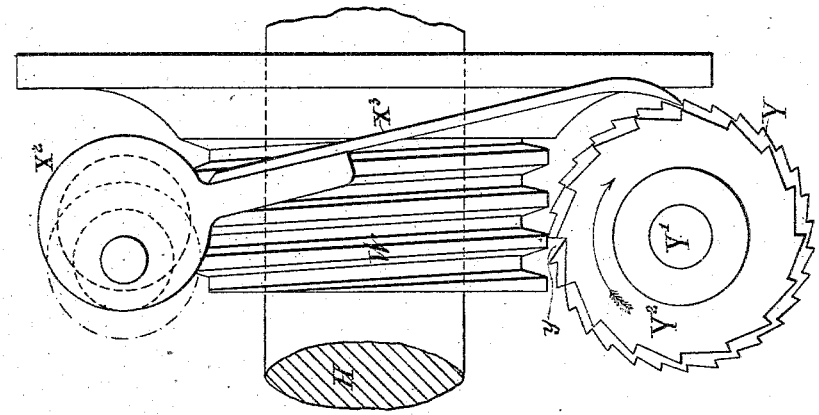
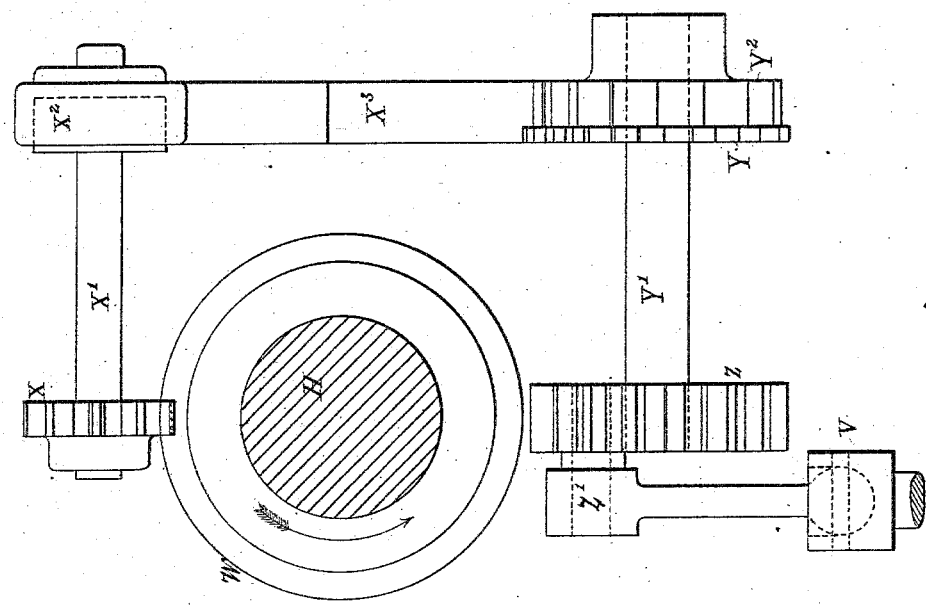
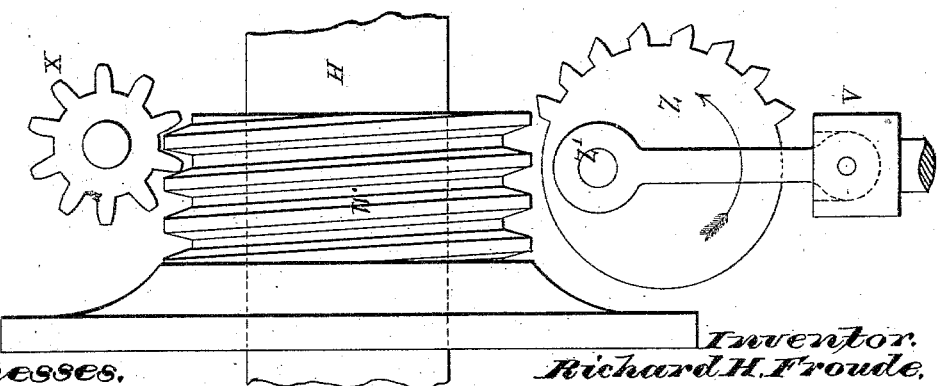

UNITED STATES PATENT OFFICE.

RICHARD HURRELL FROUDE, OF KENSINGTON, COUNTY OF MIDDLESEX, ENGLAND.

APPARATUS FOR LUBRICATING PISTONS, &c.

SPECIFICATION forming part of Letters Patent No. 295,381, dated March 18, 1884.

Application filed December 31, 1883. (No model.)

*To all whom it may concern:*

Be it known that I, RICHARD HURRELL FROUDE, a citizen of England, residing at Kensington, in the county of Middlesex, England, have invented an improved construction of apparatus for effecting the lubrication of engine pistons, bearings, and other rubbing surfaces, of which the following is a specification.

My invention has for its object more particularly to enable a rapidly-revolving shaft of a motor-engine to impart to the plunger of a lubricating-pump a slow and intermittent movement while the pump is drawing in a charge of lubricant, and a more rapid movement while it is discharging, so that a jet of lubricant can be directed onto the rubbing surfaces of the piston of the engine even in opposition to high fluid pressure. The invention is, however, equally applicable to the lubrication of other rubbing-surfaces, where it is of advantage that a quantity of lubricating fluid shall be discharged with rapidity from the pump into which it had been previously drawn by a slower motion of the piston or plunger.

The construction and working of the apparatus will be readily understood on reference to the accompanying drawings, in which Figures 1 and 2 show two opposite side views, and Fig. 3 a front view of the apparatus.

A worm, W, is formed or fixed on the rapidly-revolving shaft H, in gear with which is a worm-wheel, X, on a spindle, X', carried by suitable bearings, (not shown,) which spindle carries an eccentric, X², working a pawl, X³. This pawl is in gear with a ratchet-wheel, Y, loose on a spindle, Y', on which is fixed a second ratchet-wheel, Y², of smaller diameter than Y, and having in its circumference about half the number of teeth which Y has. Thus the pawl X³ is made to turn the ratchet-wheel Y completely round before the deep tooth $y$ of the latter allows it to come in gear with the ratchet-wheel Y², so as to turn this one tooth. Thus a very slow step-by-step motion is imparted to the spindle Y' from the rapidly-revolving engine-shaft H. On the spindle Y² is fixed a wheel, Z, having teeth on part of its circumference only, which teeth are made to gear with the worm W after the spindle Y' has been turned round to an extent corresponding with the space on the wheel Z, on which there are no teeth.

The wheel Z has a crank-pin, Z', connected by a link to the plunger V of the lubricating-pump. Thus it will be seen that after the spindle Y² has been moved round very slowly through part of its revolution by the pawl-and-ratchet wheels, thereby effecting the suction-stroke of the plunger, the teeth of Z in coming in gear with the worm W will cause the crank-pin to turn rapidly during the remainder of the revolution, and this movement being made to effect the instroke of the plunger V, the lubricant will be forced by the pump through a pipe and suitable passages to the moving parts of the engine. It will be seen that by varying the number of teeth in the ratchet-wheels and the throw of the pawl, the duration of the slow motion, and consequently that of the interval between each injection of lubricant can be varied.

Having thus described the nature of my invention, and in what manner the same is to be performed, I claim—

1. In combination with a worm on a rapidly-revolving shaft, a wheel having teeth on part of its circumference for gearing with the worm, and a crank-pin for imparting motion to a lubricating-pump, the said wheel being rotated slowly by a pawl-and-ratchet motion derived from the said worm, until its teeth come into gear with the worm, whereby it receives a rapid motion for effecting the forcing-stroke of the pump, substantially as and for the purposes described.

2. The combination of the worm W, worm-wheel X, eccentric X², pawl X³, ratchet-wheels Y Y², and wheel Z, having teeth gearing with the worm W, and a crank-pin, Z', for working a lubricating-pump, arranged and operating as herein described.

In testimony whereof I have signed my name to this specification, in the presence of two subscribing witnesses, this 20th day of December, A. D. 1883.

RICHARD HURRELL FROUDE.

Witnesses:
JNO. P. M. MILLARD,
DANIEL H. ROGERS.